United States Patent [19]

Little

[11] Patent Number: 5,308,197

[45] Date of Patent: * May 3, 1994

[54] MACHINING APPARATUS

[75] Inventor: Roger W. Little, Santa Fe, Tex.

[73] Assignee: Threading Systems, Inc., Houston, Tex.

[ * ] Notice: The portion of the term of this patent subsequent to Apr. 2, 2008 has been disclaimed.

[21] Appl. No.: 859,082

[22] Filed: Mar. 27, 1992

Related U.S. Application Data

[63] Continuation-in-part of Ser. No. 837,362, Feb. 14, 1992, abandoned, which is a continuation of Ser. No. 675,571, Mar. 25, 1991, Pat. No. 5,088,861, which is a continuation-in-part of Ser. No. 468,546, Jan. 23, 1990, Pat. No. 5,004,379.

[51] Int. Cl.⁵ .............................................. B23B 27/16
[52] U.S. Cl. .................................... 407/101; 407/103; 407/107; 407/113; 407/117
[58] Field of Search ............... 407/113, 117, 101, 103, 407/107, 114

[56] References Cited

U.S. PATENT DOCUMENTS

| | | | |
|---|---|---|---|
| 4,169,690 | 10/1979 | Kendra | 407/113 X |
| 4,695,208 | 9/1987 | Yankoff | 407/11 X |
| 5,004,379 | 4/1991 | Little | 407/117 X |
| 5,032,050 | 7/1991 | Niebauer et al. | 407/117 X |

Primary Examiner—Steven C. Bishop
Attorney, Agent, or Firm—Arthur Freilich; Robert D. Hornbaker; Leon D. Rosen

[57] ABSTRACT

A machining apparatus is described, of the type that includes a metal cutting insert which is held by an insert holder apparatus, wherein the insert can be installed in a plurality of different positions to use different ones of the cutting edges, which facilitates mounting of the insert. The holder apparatus includes a holder bar (16, FIG. 1) and a pocket member (14) that mounts on the bar and that holds an insert (12) with cutting edges (22). The pocket member has a first precision flat surface (90) that mounts facewise against a flat surface on the bar, and the pocket member has a second precision flat surface (92) that mounts facewise against a surface on the insert. The first and second flat surfaces on the pocket member can be parallel, or can be angled slightly from each other, to control orientation of the insert. The insert has a mount portion (32, FIG. 2) with a periphery lying on the sides of an imaginary polygon such as a square, and has a plurality of arms (51-54) projecting radially with respect to the insert axis (30), from a plurality of corners of the imaginary polygon. The mount portion forms locating sides (41-44) at the sides of the imaginary polygon, with a pair of such locating sides bearing against a pair of positioning sides (76, 78) of the pocket member to locate the insert with precision on the pocket member.

9 Claims, 2 Drawing Sheets

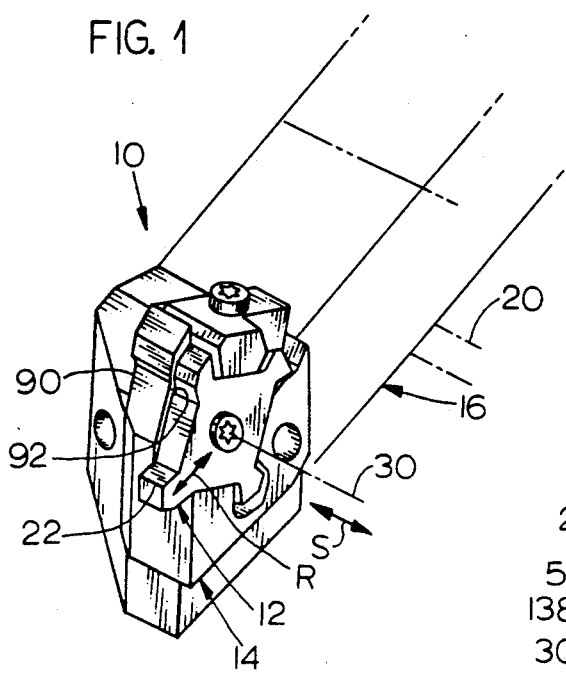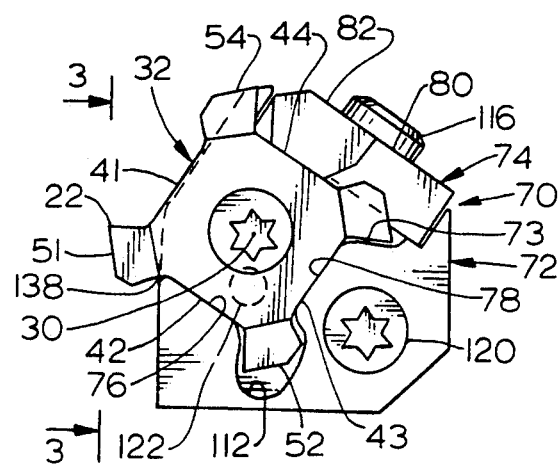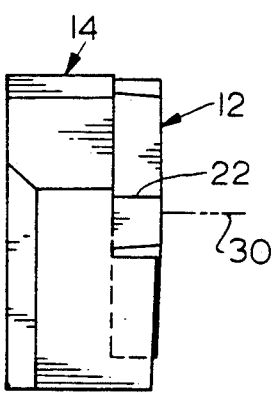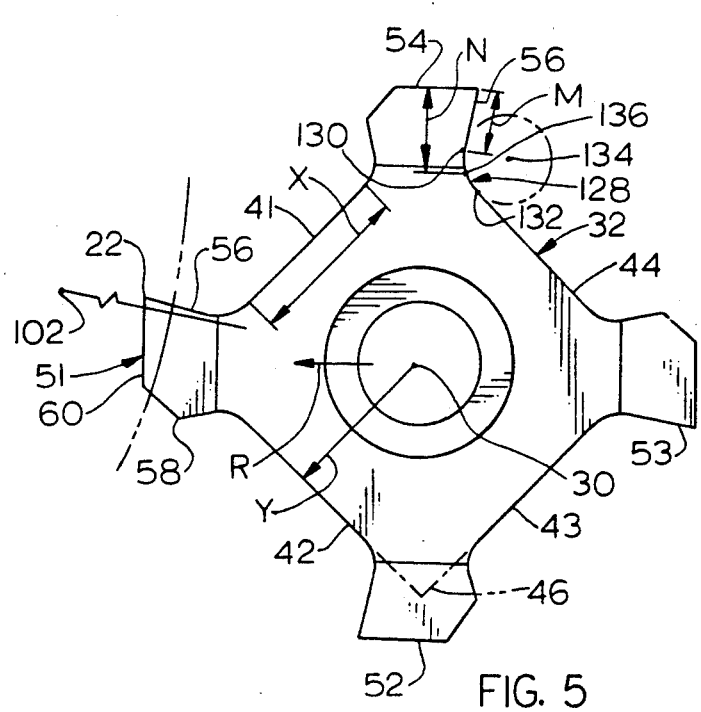

MACHINING APPARATUS

CROSS REFERENCE

This is a continuation-in-part of U.S. patent application Ser. No. 07/837,362 filed Feb. 14, 1992, which is a continuation of Ser. No. 07/675,571 filed Mar. 25, 1991 (now U.S. Pat. No. 5,088,861), which is a continuation-in-part of Ser. No. 468,546 filed Jan. 23, 1990 (now U.S. Pat. No. 5,004,379).

BACKGROUND OF THE INVENTION

Metal machining can be accomplished by mounting a workpiece on a rotating chuck of a lathe, and moving the cutting edge of an insert into the workpiece to thread, groove or otherwise remove metal from the workpiece. The insert is mounted on a holder apparatus that is, in turn, mounted on a tool post and adjustable slides of a carriage of the lathe. The cutting edge of the insert has a limited life, and the life of the insert is increased by constructing it with multiple cutting edges. Different machining operations such as cutting different size threads, grooving, etc. require removal of one insert and replacement with another. It would be desirable if the insert had a maximum number of usable identical cutting edges, with the insert being easily repositioned to locate a new cutting edge precisely in the place of a previous one. Also, it would be desirable if one insert could be rapidly removed and another one precisely mounted in its place.

SUMMARY OF THE INVENTION

In accordance with one embodiment of the present invention, a machining apparatus is provided which includes an insert having a mount portion whose periphery forms a plurality of straight locating sides lying on the sides of an imaginary polygon and having arms extending from a plurality of corners of the imaginary polygon. A pocket member has flat surfaces at its opposite sides, with a first surface lying facewise against a bar surface and a second surface lying facewise against a flat surface of the insert. The pocket member also has a pair of positioning sides which abut a pair of locating sides of the insert to accurately locate the insert on the pocket member.

The first and second flat surfaces of the pocket member can lie precisely parallel, or can lie at an angle to each other, to control the orientation of the insert cutting edge that is being used. A plurality of the insert locating sides are considerably longer than the insert arms, so long locating surfaces are available to withstand the stresses of machining while the projecting arms are short to minimize stresses on them.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partial isometric view of a machining apparatus constructed in accordance with one embodiment of the present invention.

FIG. 2 is a side elevation view of the pocket member and insert of the apparatus of FIG. 1.

FIG. 3 is a view taken on the line 3—3 of FIG. 2.

FIG. 4 is an underside view of the clamp of the pocket member of FIG. 2.

FIG. 5 is a side elevation view of the insert of FIG. 2.

DESCRIPTION OF THE PREFERRED EMBODIMENTS

Figure 6:
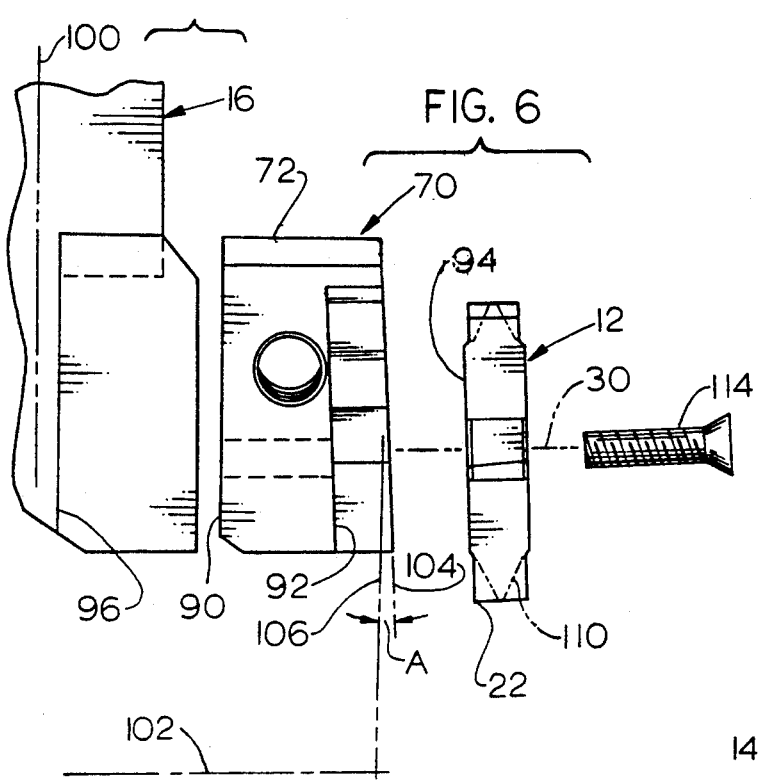
FIG. 6 is a partial exploded view of the apparatus of FIG. 1.

FIG. 1 illustrates a machining apparatus 10 which includes a plate-like metal cutting insert 12 mounted on a pocket member 14, the pocket member being mounted, in turn, on a tool holder in the form of a bar 16. The tool holder is mounted on a tool post which lies on sliders of the carriage 20 of a lathe which holds a workpiece that is rotated while a cutting edge 22 of the insert is advanced into the workpiece.

As shown in FIG. 5, the insert 12 has an axis 30 and has a mount portion 32 centered on the axis. The mount portion has a periphery forming a plurality of straight locating sides 41-44 that are angled from each other and that lie on the sides of an imaginary polygon 46. The particular polygon 46 is a square, so the locating sides 41-44 lie on the sides of the square. The insert also has a plurality of arms 51-54 extending radially away from the axis 30, from the corners of the imaginary square. Each arm has an upper side 56 and an outer edge 60, and forms the cutting edge 22 at the intersection of the side 56 and outer edge 60. The insert illustrated in FIGS. 1-5 is a grooving insert, wherein the cutting edge 62 extends axially, that is, primarily parallel to the axis 30 of the insert. The insert can be of a different type such as a threading insert, where the cutting edge is V shaped, or a grooving insert which cuts a groove with a cross section in the shape of a radius form.

As shown in FIG. 2, the pocket member 70 includes a main part 72 which has a recess 73 that closely receives the insert, and a clamp 74. The main part 72 includes two positioning sides 76, 78 which are precision machined so they can lie parallel to and facewise against a pair of locating sides such as 42, 43 of the insert. The clamp 74 has a mounting part 80 that mounts on the main part 72 of the pocket member, and has an insert-engaging part 82. The insert-engaging part 82 presses against a locating side 44 of the insert, to press an opposite insert locating side 42 against a positioning side 76 of the pocket member. The insert is accurately located by installing it with its locating sides 42, 43 pressing against the positioning surfaces 76, 78 prior to tightening of the clamp 74. The friction between the sides or surfaces 42, 76 keeps the locating side 43 against the positioning side 78.

Referring to FIG. 6, it can be seen that the main part 72 of the pocket member 70 has a pair of flat pocket member face surfaces 90, 92 which each extends primarily perpendicular to the axis 30 of the insert 12. That is, the axis 30 is parallel to lines extending substantially normal to each of the surfaces 90, 92. The face surface 92 lies at the bottom of the recess 73. The insert 12 has an orienting face surface 94 which extends perpendicular to the axis 30. The tool holder or bar 16 has a holder face surface 96 which also extends primarily perpendicular to the axis 30. The insert 12 is mounted on the pocket member 70 with the surfaces 92, 94 lying facewise against each other. The pocket member 70 is mounted on the bar 16 with the surfaces 90, 96 lying facewise against each other.

In many machine operations, a bar axis 100 extends radial to the axis of rotation 102 of the workpiece, as seen in a plan view as in FIG. 6. If the pocket member surfaces 90, 92 are precisely parallel (parallel within less than 0.5 degrees), then the orienting surface 92 of the insert will also extend radial to the axis 102. However, in many situations it is desirable to have the insert 12 extend in a direction 104 which is at a small angle A of up to ten degrees from a rotation radial direction indicated by line 106. For example, an insert with a thread cutting edge indicated at 110 for cutting threads may preferably be angled by a few degrees (either clockwise or counterclockwise from direction 106) to provide helix angle compensation. The pocket member 70 can provide such angling by angling its first and second surfaces 90, 92 up to ten degrees from parallelism with each other. It would be difficult to construct an insert with such angling for each of the plurality of cutting edges lying at the ends of different arms. It would be possible to provide such angling in the holder bar 16, but the bar 16 is larger and generally more expensive than the pocket member.

The apparatus is preferably used by providing a machine shop with several inserts, with some inserts having a shape shown in FIGS. 1-5 for forming grooves with flat bottoms, others for forming different shape grooves, and others for forming threads of different sizes and thread types, etc. Inserts of smaller size and lower cost may be used to cut smaller grooves and threads. A few different types of pocket members are provided, with some holding a different size of insert, and with some pocket member providing different angles A (of zero degrees plus or minus up to ten degrees).

Figure 7:
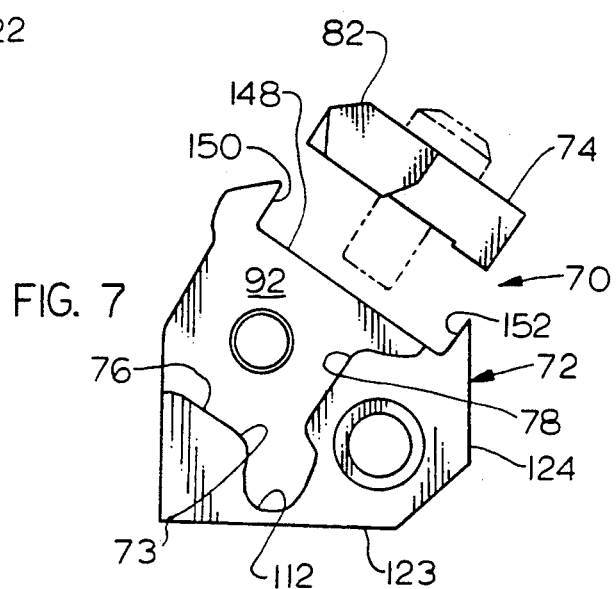
FIG. 7 is an exploded view of the pocket member of FIG. 2.
Figure 8:
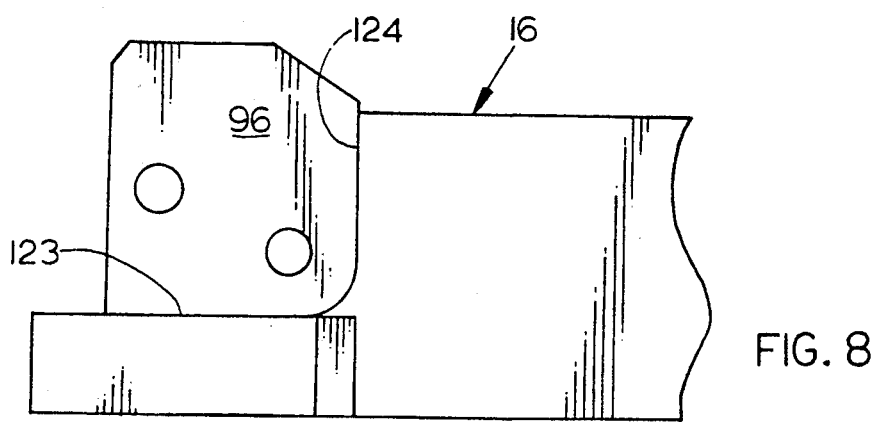
FIG. 8 is a partial side elevation view of the tool holder bar of FIG. 1.

A single holder bar 16 can be sufficient. An insert 12 is mounted on a pocket member 70 by first placing the insert as shown in FIG. 2, with a pair of locating sides 42, 43 against a pair of positioning sides 76, 78, and with one arm 52 lying in a cutout 112 of the pocket member. A screw 114 may be installed, but not yet tightened. The clamp 74 is already in place but not tightened. With the locating sides 42, 43 lying against the positioning sides, a clamp screw 116 is tightened. The screw 114 can be tightened to hold the orienting surface 94 (FIG. 6) of the insert against the second pocket member surface 92. Although applicant prefers to use the clamp 74 to hold the insert in position, it is possible to use only the screw 114, although this can decrease precision of insert holding with respect to the pocket member. The pocket member, with the insert installed thereon, is installed on the holder bar 16 by a pair of screws shown in FIG. 2 at 120, 122. A pair of pocket member sides 123, 124 (FIG. 7) lie against a pair of holder bar sides 125, 126 (FIG. 8) to transfer forces to the bar.

When one of the cutting edges such as 62 becomes worn, the clamp screw 116 can be loosened slightly, the insert screw 114 removed, and the insert removed and turned 90° and reinserted into the pocket member. Then the clamp screw 116 and insert screw 114 are tightened. The insert is positionable at different rotational positions with high accuracy such as 0.0005 to 0.001 inch. Different pocket members are positionable with moderate accuracy such as 0.005 inch. The particular insert 12 is a grooving insert which has four cutting edges 62 each extending substantially axially. A threading insert of the type indicated at 110 in FIG. 6 can include two cutting edges at each arm, for a total of eight cutting edges.

As shown in FIG. 5, each arm such as 54 can have a straight upper surface 56 (it is uppermost in its used position) having a length M, as seen in a view along the axis 30. The side 56 is preferably straight, although it can be curved. The arm also has a lower side 58. A curved transition portion 128 extends between each end of a locating side 41-44 and an adjacent arm side. The transition portion extends between the points 130, 132, where the insert is curved about an axis of curvature 134. The straight part of the insert lying between adjacent arms, which forms one of the locating sides 41 - 44, has a length X which is preferably much greater than the length M or of the distance N between the outer edge 54 and the center 136 of the curved transition portion, and is preferably at least fifty per cent longer than either of them. The long locating sides 41-44 lie a considerable distance Y from the axis 30. The long locating sides and their considerable distance from the axis, enable the locating sides to hold the insert with high precision on the pocket member, and to withstand the large forces applied during metal cutting. During metal cutting, when large forces are applied to the cutting edge 22, such large forces are resisted largely by the area of contact between the locating side 42 and positioning side 76. The long length of such sides and correspondingly large area contact, enables large forces to be resisted without deforming the sides or surfaces. It is noted that the pocket member provides a space, 138 under the arm 51, because any contact between them could result in applying forces over a small area and creating high pressures, and because this would interfere with precise positioning of the insert against the straight positioning surfaces 76, 78 of the pocket member.

The lower surface of the clamp 74 of the pocket member is shown in FIG. 4, which shows that the clamp has three clamping regions 140, 142 and 144. The regions 140, 142 clamp against the main part of the pocket member (at surface 148 in FIG. 7), while the surface region 144 presses against the locating side 44 of the insert. The mounting part 80 of the clamp fits very closely between upstanding walls 150, 152 (FIG. 7) of the pocket member main part to prevent rotation of the clamp.

Thus, the invention provides a machining apparatus of the type which includes an insert with cutting edges which is held by a holding apparatus, which facilitates precise holding of the insert, which provides an insert with multiple cutting edges for a long lifetime of use, and which minimizes the costs and number of parts that must be stocked. The insert has long locating sides lying on the sides of an imaginary polygon and has a plurality of arms projecting from corners of the imaginary polygon, with each arm forming at least one cutting edge. The holding apparatus can include a pocket member which has a pair of opposite precision flat surfaces, with a first surface being mountable against a flat surface of a bar or other holder, and with a second precision flat surface being mountable facewise against a flat orienting surface of the insert which extends perpendicular to its axis. A single pocket member can hold a variety of inserts and allow the inserts to be removed to be rotated so a different cutting edge is used, or for replacement of the entire insert. The first and second flat faces of the insert can be parallel or can be angled from the first surface. Apparatus illustrated in the figures are likely to be sold so the holder bar 16 sells for $50.00, the pocket member 14 sells for $35.00, threading inserts sell for about $20.00, and grooving inserts sell for about $12.00 each, with the cost of an insert varying with its size.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A machining apparatus comprising:
an insert having a mount portion with a plurality of straight locating sides lying on the sides of an imaginary polygon that has an axis and corners, said insert having a largely radially outwardly extending arm at each of a plurality of said corners of said imaginary polygon, with each arm having a cutting edge, with each arm having an arm upper side extending substantially radially to said cutting edge, and with each arm having a lower side;
said insert forms a concave transition portion between each end of each of said straight locating sides and an adjacent side of a corresponding one of said arms.

2. The apparatus described in claim 1 including:
a tool holder apparatus having a recess that holds said inset, said recess having walls forming two straight holder positioning surfaces that abut only two of said insert locating sides at one time, and said holder apparatus having a clamp that presses against said insert to press one of said insert locating sides against one of said positioning surfaces, whereby to accurately locate said insert;
a first of said arms extending beyond said tool holder to cut a workpiece, and a first of said locating sides lies closest to said first arm but is out of contact with the transition portion which extends from the lower side of said first arm to leave a space between said transition portion and said first locating side.

3. The apparatus described in claim 1 wherein:
said insert has a flat orienting surface extending perpendicular to said insert axis; and including
a tool holder apparatus including a bar and a pocket member mounted on said bar and holding said insert, said bar having a flat bar surface extending primarily parallel to said insert orienting surface;
said pocket member forming a first flat pocket face surface lying facewise against said bar surface, and said pocket member forming a second pocket face surface lying facewise against said insert orienting surface, with the angle between said first and second pocket face surfaces being at least one degree but no more than ten degrees.

4. The apparatus described in claim 1 wherein:
the length of each of a plurality of said locating sides is more than fifty percent greater than the length of each of said arm sides as viewed along said axis.

5. A machining apparatus, comprising:
an insert largely in the form of a plate having a mount portion with a plurality of sides lying on the sides of an imaginary polygon having an axis, said sides forming locating sides, said insert having a plurality of arms projecting radially outwardly at the corners of said imaginary polygon, each arm having a substantially radially extending arm side with a radially inner end merging with one of said locating sides and with a radially outer end, said arm forming a cutting edge lying at said radially outer end of said arm side;
a tool holder apparatus which includes a pair of flat positioning surfaces constructed to bear against a pair of said insert locating sides, and a cutout lying between said positioning surfaces for receiving one of said arms, said cutout being large enough that it does not engage any portion of an arm lying therein, said tool holder apparatus including means for pressing an insert locating side against said one of said positioning surfaces.

6. The apparatus described in claim 5 wherein:
said locating sides of said mount portion lie at the sides of an imaginary square, and the middle of each of said locating sides is closer to said axis than either end of the locating side.

7. In a machining apparatus which includes a pocket member that can mount on a holder and that can hold a cutting insert which forms a cutting edge for machining a workpiece, wherein said pocket member has a first flat pocket face surface for mounting facewise against a flat holder surface of said holder, and said pocket member has a second flat pocket face surface against which can be mounted a flat orienting face surface of said insert, the improvement wherein:
said second flat pocket face surface is angled by at least one degree, but not more than about ten degrees, from parallelism with said first flat pocket face surface.

8. A machining apparatus comprising:
an insert having an axis, said insert having a mount portion which is centered on said axis and which has a mount periphery forming at least three straight locating sides that lie on the sides of an imaginary polygon, said insert having an insert periphery forming a plurality of cutting edges, and said insert forming a flat insert orienting surface extending perpendicular to said axis;
a tool holder apparatus which forms a flat surface and first and second straight positioning sides;
said insert is mounted on said holder apparatus with said insert orienting surface lying facewise against said holder apparatus flat surface, and with each of a pair of said insert locating sides lying against a different one of said holder positioning sides;
a clamp which is mounted on said holder apparatus and which presses against a third of said insert locating sides to press at least one side of said pair of locating sides firmly against at least one of said pair of positioning sides.

9. The apparatus described in claim 8 wherein:
the middle of each side of said imaginary polygon extends perpendicular to an imaginary line projecting radially from said axis, said insert has a largely radially outwardly extending arm at each of a plurality of said corners of said imaginary polygon, with each arm forming one of said cutting edges, and said holder apparatus has a recess that receives one of said arms but with the recess wall out of engagement with said arm, and said positioning sides lying on opposite sides of said recess.

* * * * *